United States Patent [19]
Schäfer

[11] Patent Number: 6,072,246
[45] Date of Patent: Jun. 6, 2000

[54] PROCESS FOR TRIGGERING A PASSIVE OCCUPANT SAFETY PROTECTION SYSTEM FOR MOTOR VEHICLES

[75] Inventor: Gerhard Schäfer, Weinsberg, Germany

[73] Assignee: Temic Telefunken microelectronic GmbH, Heiilbronn, Germany

[21] Appl. No.: 08/889,498

[22] Filed: Jul. 8, 1997

[30] Foreign Application Priority Data

Jul. 11, 1996 [DE] Germany ............................ 196 27 877

[51] Int. Cl.[7] .................................................. B60R 21/32
[52] U.S. Cl. ......................... 307/10.1; 180/282; 280/735
[58] Field of Search ..................................... 307/9.1, 10.1,
307/64–66, 43, 48; 340/669, 436, 438,
440; 280/734, 735; 180/271, 274, 282;
200/61.45 R

[56] References Cited

U.S. PATENT DOCUMENTS

| | | | |
|---|---|---|---|
| 4,933,570 | 6/1990 | Swart et al. | 307/10.1 |
| 5,204,547 | 4/1993 | Schumacher et al. | 307/10.1 |
| 5,442,244 | 8/1995 | Furui | 307/10.1 |
| 5,646,454 | 7/1997 | Mattes et al. | 307/10.1 |

FOREIGN PATENT DOCUMENTS

| | | |
|---|---|---|
| 3913628 | 11/1989 | Germany . |
| 4319001 | 12/1993 | Germany . |
| 4409019 | 9/1994 | Germany . |
| 4439203 | 5/1996 | Germany . |

*Primary Examiner*—Richard T. Elms
*Attorney, Agent, or Firm*—Venable; George H. Spencer; Norman N. Kunitz

[57] ABSTRACT

A process used to trigger a passive occupant protection system for motor vehicles where at least one electric ignition agent for a safety device protecting one person in the event of a hazardous impact, in particular an airbag or a belt tensioner, is provided with ignition energy by a trigger current which—in the event of a functional failure occurring in the on-board electric system of the motor vehicle—is generated as the discharge current of an autarchic capacitor. According to the invention, this autarchic capacitor simultaneously provides the trigger currents for multiple ignition agents—in particular squibs used for airbags—, with the respective trigger current of each ignition agent being pulse-width modulated such that the ignition energy required for the respective ignition agent is preset by the pulse-to-pause ratio of the trigger current. On the one hand, this invention provides for a reduction in the number of components required as one single autarchic capacitor supplies multiple ignition agents, and, on the other hand, each ignition agent will be allocated the ignition energy required to enable safe ignition without accepting an excessive dimensioning of the autarchic capacitor. Furthermore, when compared to the state of the art, the invention leads to a reduced chip surface area of the power amplifier transistors. Finally, a circuit is disclosed for implementing the process according to the invention.

3 Claims, 5 Drawing Sheets

FIG.9

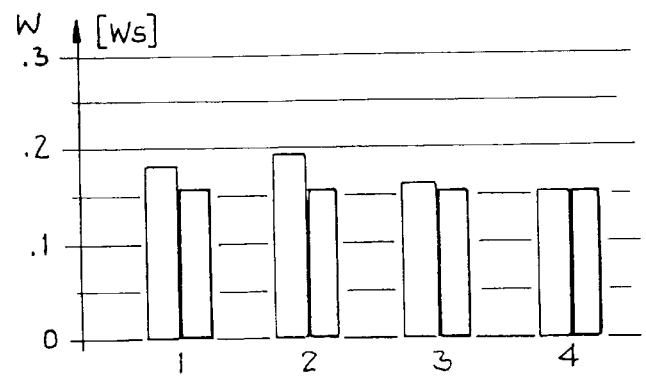
FIG. 5
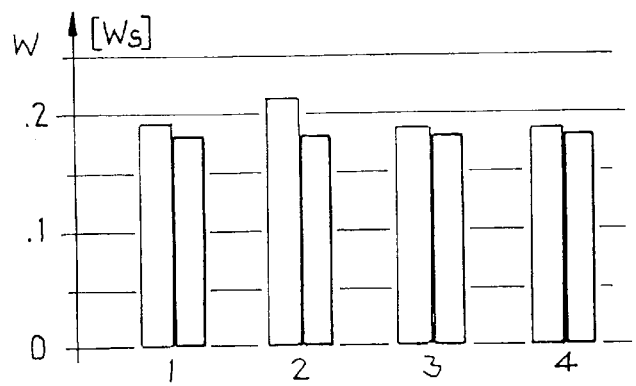
FIG. 6
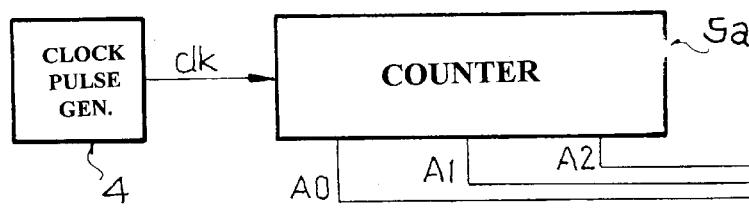
FIG. 7
Fig. 7a Clock 
Fig. 7b A0 
Fig. 7c A1 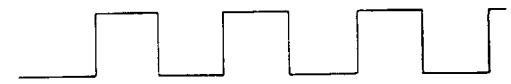
Fig. 7d A2 
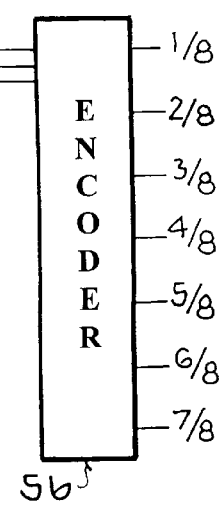

PROCESS FOR TRIGGERING A PASSIVE OCCUPANT SAFETY PROTECTION SYSTEM FOR MOTOR VEHICLES

BACKGROUND OF THE INVENTION

The invention concerns a process used to trigger a passive occupant protection system for motor vehicles where at least one electric ignition agent for a safety device protecting one person in the event of a hazardous impact, in particular an airbag or a belt tensioner, is provided with ignition energy by means of a trigger current which, if a function defect occurs in the on-board electrical system of a motor vehicle, is generated as a discharge current of an autarchic capacitor, and where this autarchic capacitor provides the trigger currents for multiple ignition agents simultaneously. In addition the invention also concerns a circuit for implementing this process.

A process of this type is known from DE 43 19 001 A1.

With regard to occupant protection systems for motor vehicles such as for example airbag systems or belt tensioners, a very high degree of system reliability is required as they are particularly critical to safety.

Airbag systems usually feature one trigger circuit for each airbag, complete with an ignition agent activating the airbag, a so-called squib, which is located in series to a controllable switch or—for reasons of safety—in series between two controllable switches. In the event of a hazardous impact, a control unit interacting with accelerometers will activate the ignition agents by closing the controllable switches contained in the trigger circuit by means of a trigger signal.

Furthermore, it is known that, if the on-board electrical system of a motor vehicle fails or if a function defect occurs in the electrical system, a safety capacitor (autarchic capacitor) is to be provided which ensures that even in such cases electrical energy is supplied to the ignition agent. Such an autarchic capacitor is known from DE 39 13 628 A1, which supplies not only the ignition agent with the necessary trigger current but also simultaneously the trigger circuit for the ignition agent. Finally, this capacitor will be continuously checked with regard to its charge state in order to ensure its functional reliability.

In addition, a triggering process for an igniter in an airbag is known from DE 44 09 019 by means of which two capacitors are charged up from the on-board electrical system of the motor vehicle. These two capacitors are connected in series to the ignition agents such that, in the event of an impact, sufficient energy will be supplied to the ignition agent in the shortest possible time by means of a closed switch.

Finally, it is known from DE 43 19 001 already mentioned above that, instead of using simultaneously a single autarchic capacitor for multiple ignition agents within an occupant protection system, each ignition agent is to be provided with its own respective autarchic capacitor. As a disadvantage of the simultaneous use of a single autarchic capacitor for multiple ignition agents, this publication states that problems occur inasmuch as the resistance values of the ignition agents are not balanced and that in the event of a short-circuit occurring on one of the ignition agents the occupant protection system cannot be triggered.

The current standard equipment of a motor vehicle comprising two airbags and two belt tensioners therefore requires four power amplifier stages and four autarchic capacitors for energy storage. However, as side airbags are increasingly included in the standard safety equipment of a motor vehicle the number of power amplifier stages and autarchic capacitors would be augmented to six. This leads to a large number of external components which would render such a safety system significantly more expensive.

A further disadvantage is that the ignition agent, i.e. the squib, of the airbag is offered far more energy than is actually required for a safe ignition of the same; there is no justification for this, not even on the grounds of operational safety. For example, the resistance of a squib can adopt a value between 1.6 and 6.6 ohms so that the energy stored in an autarchic capacitor is to be designed for the maximum resistance of a squib. The ignition energy for such a squib, for instance, corresponds to a current of 2 A for a period of 6 ms. If during this time a capacitor with a capacity C=2200 $\mu$F is charged with a charge voltage of 27 volts, a maximum initial current of 16.8 A will flow, provided the resistance value of the squib is between 1.6 and 6.6 ohms. This leads to a large chip surface area of the power amplifier stage transistors required for the trigger circuit, as their surface area sizes are determined in proportion to the initial current.

SUMMARY OF THE INVENTION

The object of the invention is to provide a process for triggering a passive occupant protection system for motor vehicles of the type mentioned above which process requires only a few components and leads to small chip surface areas of the power amplifier transistors used in the trigger circuit.

According to the invention a single autarchic capacitor does not only supply one ignition agent with the required trigger current but at the same time also generates the trigger currents for multiple ignition agents. In so doing, the trigger currents of each ignition agent will be pulse width modulated such that the ignition energy required for the respective ignition agent will be preset by means of the pulse-to-pause ratio of the trigger current.

This achieves the most significant aim of the invention, namely to reduce the number of external components involved, at the same time, an improvement in the adaptation of the energy distribution to ignition agents differing in their resistance values is also achieved, thus enabling a single autarchic capacitor to be used simultaneously and without problems for 4 ignition agents.

The principal difference in relation to the state of the art is that the switches closing the trigger circuit are not permanently closed during the time required but are controlled intermittently so that the current course of the trigger current is chopped in order to achieve a meaningful energy distribution.

Pursuant to an advantageous further application of the process according to the invention, the electric resistance of each ignition agent will be determined whilst the motor vehicle is in operation, in order to define therefrom the ignition energy required for the respective ignition agent as a pulse-to-pause ratio for the trigger current.

As a rule, measurement of the ignition agent resistance values is included in the functional check of the occupant protection system so that, based on the resistance value determined, the required ignition energy can be defined for each respective ignition agent without any additional hardware being required.

For implementation of the process according to this invention, a circuit is provided wherein at least one controllable switch—in particular an power amplifier transistor—is connected in series to each ignition agent, and wherein furthermore a trigger circuit is provided which respectively drives the controllable switches by means of a PWM (pulse-width modulated) signal.

In order to determine the electric resistance of each ignition agent, the drive circuit is provided with a means to apply a measurement current to the respective ignition agent, but with the energy supplied to the ignition agent remaining below the minimum energy required for an ignition.

Finally, in a further embodiment of the invention a control unit is preconnected to the drive circuit which determines the resistance value of the ignition agent on the basis of the voltage drop measured on the ignition agent to which the measurement current has been applied.

BRIEF DESCRIPTION OF THE DRAWINGS

In the following the implementation of the process according to the invention is to be illustrated and explained by means of circuit layouts in connection with the drawings, wherein FIG. 5 is a bar chart diagram in respect of the energy consumption of 4 squibs with respective resistance values of 6.6 ohms each, FIG. 6 is a further bar chart diagram in respect of the energy consumption of 4 squibs with respective resistance values of 6.6 ohms each, where a drop resistor is preconnected in each case, FIG. 7 is a block diagram for generating different clock signals A0, A1, and A2, FIGS. 7a–7d show the different clock signals for the circuit of FIG. 7.

DESCRIPTION OF THE PREFERRED EMBODIMENTS

Figure 1:
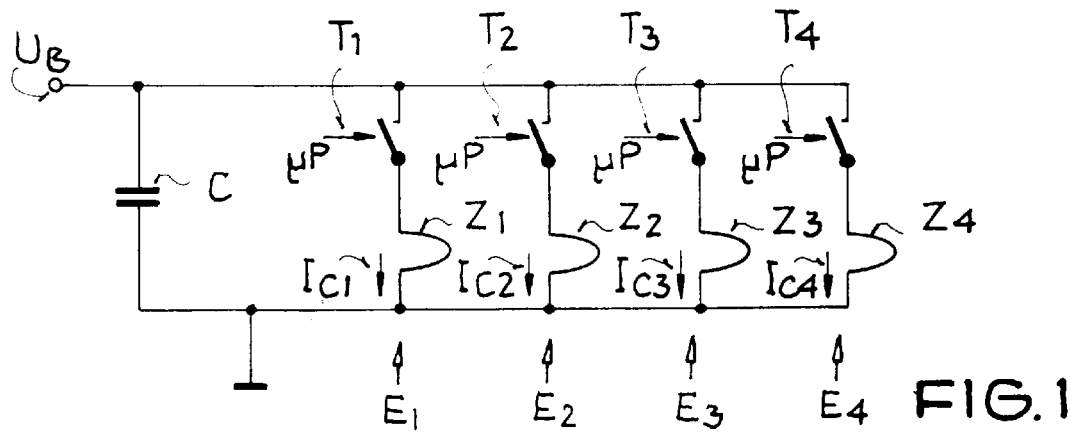
FIG. 1 is a circuit layout in principle for implementing the process according to the invention.

The configuration in principle of a trigger circuit comprising four power amplifier stages E1, E2, E3, and E4 is shown in FIG. 1 where 4 ignition agents Z1 to Z4, respectively connected in series with power amplifier transistors T1 to T4, are connected in parallel to a single autarchic capacitor C. This autarchic capacitor C is charged up by means of an operating voltage $U_B$ which can represent the on-board battery or a power supply fed by the on-board battery. The power amplifier transistors T1 to T4 are driven individually via their own respective lines by means of a microprocessor μP (microprocessor μP is not shown here).

Figure 2:
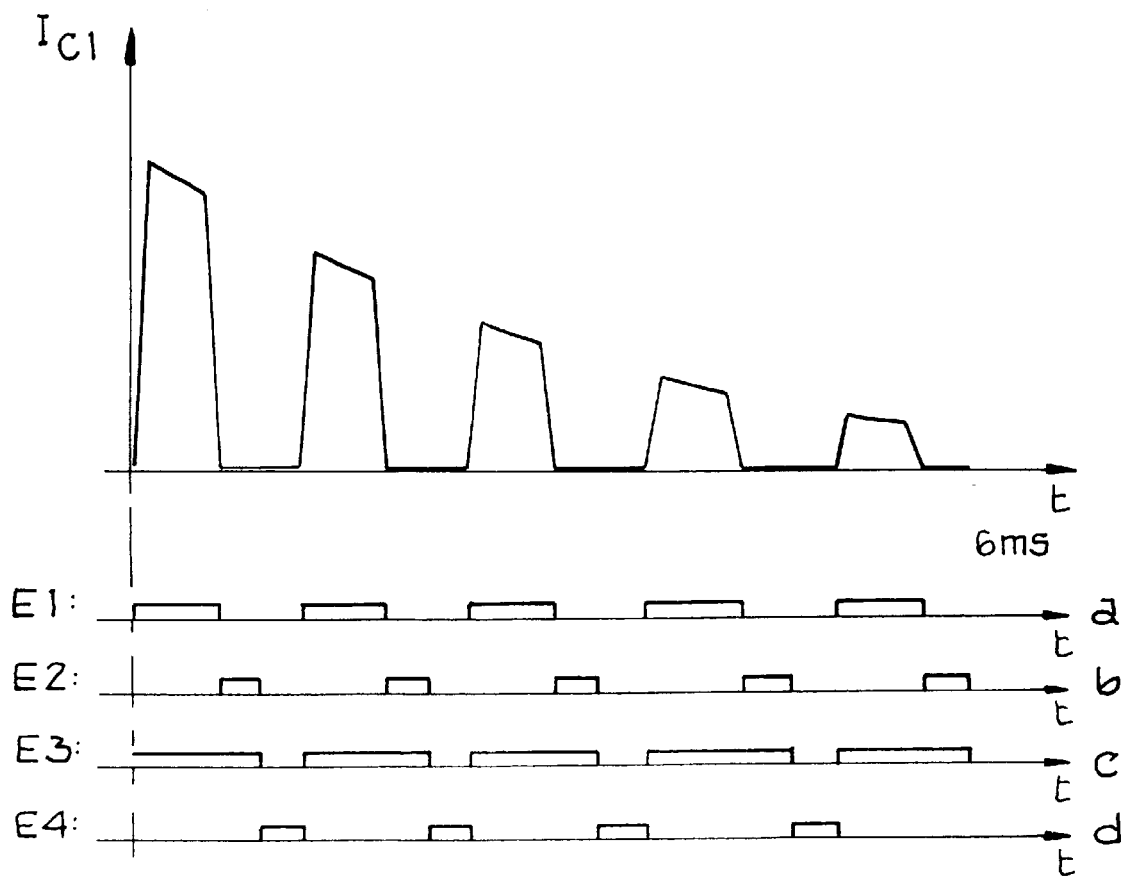
FIG. 2 is a time-voltage diagram for elucidating the functionality of the circuit layout according to FIG. 1.

These power amplifier transistors T1 to T4 are driven by a PWM signal such that they are not permanently closed but intermittently are either in an open or a closed condition. This results in a chopped course of the discharge currents $I_{C1}$, $I_{C2}$, $I_{C3}$, and $I_{C4}$, supplied by capacitor C, as is shown by way of example in the time/current diagram of FIG. 2 line a for discharge current $I_{C1}$ of power amplifier stage E1. However, lines b, c and d of FIG. 2 only show the associated current flow times through ignition agents Z2, Z3, and Z4.

Here, these current flow times are selected such that each ignition agent Z1 to Z4 is supplied with sufficient energy that ensures a safe ignition of the device. From this FIG. 2, it can be seen easily that the power amplifier stages which comprise an power amplifier transistor $T_i$(i=1–4) and an ignition agent $Z_i$(i=1–4) are allocated different pulse distributions, with the pulse distribution allocated to each power amplifier stage being determined by the resistance value of the respective ignition agent $Z_i$(i=1–4).

As a limiting condition for dimensioning the autarchic capacitor C the following applies: even if the resistance values are distributed unfavorably, that is, even if all resistance values of ignition agents Z1 to Z4 are determined as being at the top resistance value occurring, 6.6 ohms for example, the energy must still suffice for all ignition agents Z1 to Z4. The total energy amount $W_{ges}$ results from the adopted values according to the formula shown below:

$$Wges = 0.024 \text{ Ws} * \overline{\frac{R_1}{\Omega} + \frac{R_2}{\Omega} + \frac{R_3}{\Omega} + \frac{R_4}{\Omega}}^2 = 0.154 \text{ or } 0.634 \text{ Ws}, \quad (1)$$

where R1 to R4 represent the respective resistance values of the ignition agents Z1 to Z4 and the energy value of 0.154 Ws or 0.634 Ws results for ignition agents Z1 to Z4 with the lowest resistance value of 1.6 ohms or with the highest resistance value of 6.6 ohms.

If a meaningful capacity value for the autarchic capacitor C is assumed, such as—for example—4700 μF, then for a maximally required total energy amount of 0.634 Ws a charge current of 18.5 V results. Each power amplifier transistor T1 to T4 must then be designed for a current of 11.57 A.

Compared to the state of the art, this results in a current reduction, with a separate autarchic capacitor being used for each power amplifier stage, and thus also in a reduction of the chip surface area required for the power amplifier transistors. If, according to the state of the art, an autarchic capacitor for a single power amplifier stage is assumed to have 2,200 μF with a charge voltage of 27 V, then in the most unfavorable case relative to the ignition agent resistance values a maximum current of 16.8 A will result.

The PWM signals used for driving power amplifier stage transistors T1 to T4 feature a pulse duration of 33 μs where a division on the basis of 3 bits—resulting in a division on the basis of 1/8 — is effected. This results in a pulse-to-pause ratio of 1/8 to 8/8 , and thus in a corresponding allocation of energy.

Figure 3:
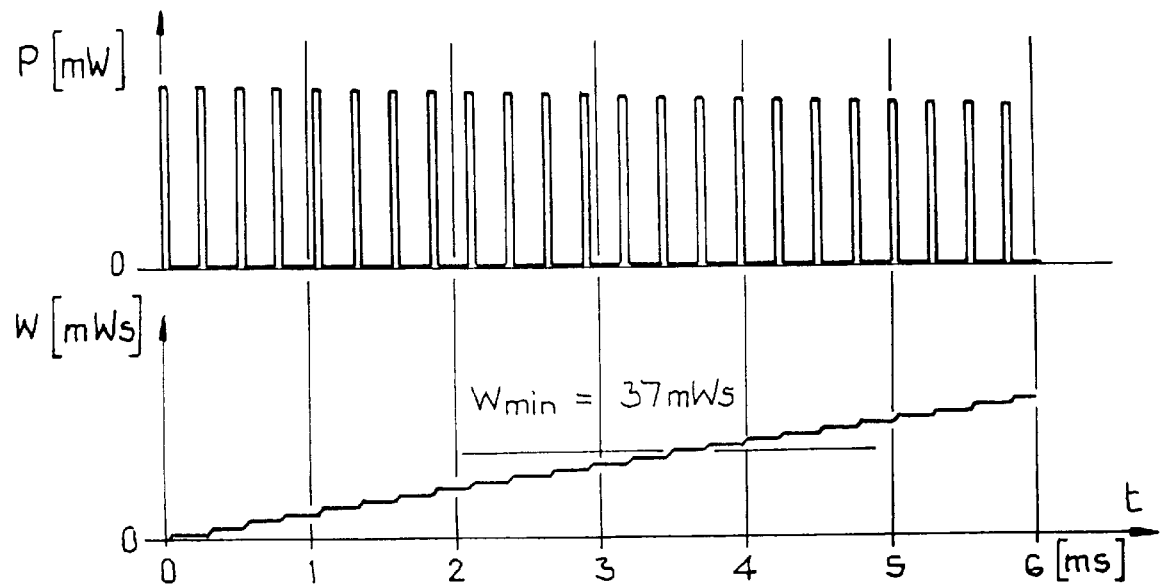
FIG. 3 is a time-energy or performance diagram for elucidating the functionality of the circuit according to FIG. 1.

In this connection FIG. 3 shows the energy or power consumption of an ignition agent $Z_i$ with a resistance value of 1.6 ohms from an autarchic capacitor C with 4700 μF and a charge voltage of 18.5 V. Here, the pulse-to-pause ratio of the PWM signal is 1/8 as can be seen from the time/performance diagram shown in FIG. 3.

From the time/energy diagram shown in the same figure, it can be seen that the minimum energy required $W_{min}$ of 37 mWs is safely reached but exceeded only minimally, so that there is hardly any waste of energy.

Figure 4:
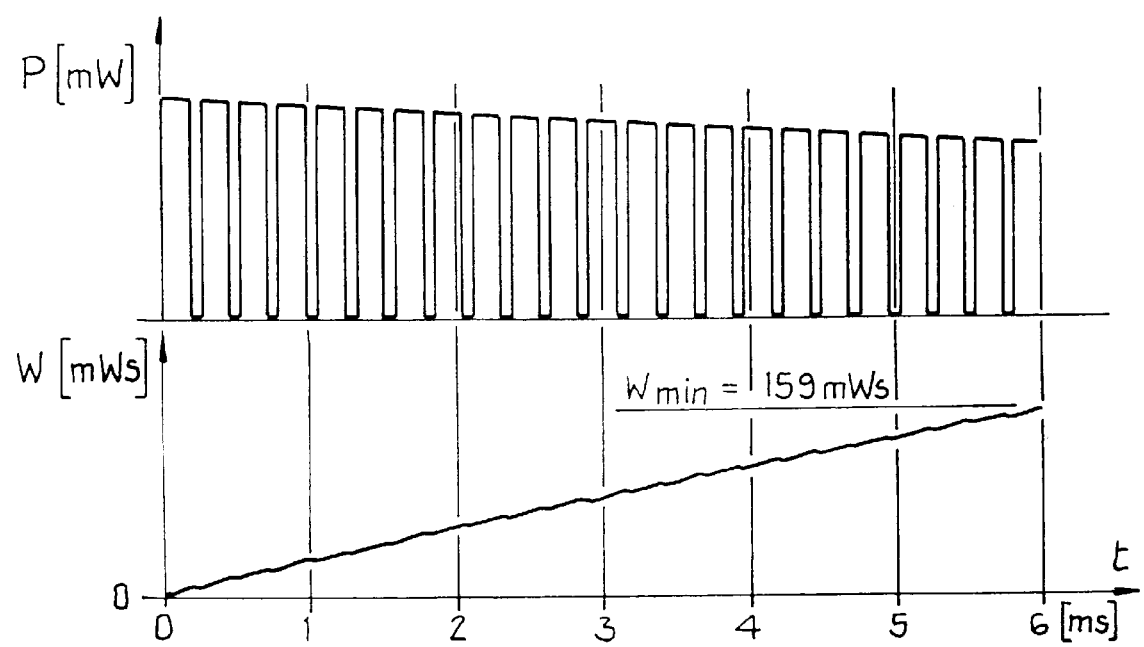
FIG. 4 is a further time-energy or performance diagram.

Furthermore, in a second example according to FIG. 4, the energy consumption of an ignition agent $Z_i$ — with a maximum resistance of 6.6 ohms—from an autarchic capacitor dimensioned as stated above will be shown.

The top diagram in FIG. 4 shows the power consumption when using a PWM signal featuring a pulse-to-pause ratio of 6/8 . Using such a PWM signal, the required energy $W_{min}$ of 159 mWs is just reached. For reasons of safety, a slightly higher capacity or a higher charge voltage could be used in such cases.

Finally, the energy consumption for 4 power amplifier stages connected in parallel according to FIG. 1 is to be shown, where in the most unfavorable case a resistance value of 6.6 ohms ea assumed for ignition agents Z1 to Z4. The autarchic capacitor C features a capacity of 4700 μF and is charged Up by means of a 21 V charge current. The bar chart diagram according to FIG. 5 shows a corresponding energy distribution for ignition agents Z1, Z2, Z3, and Z4. The left-hand bar shows the actual energy consumption and the right-hand bar the minimum energy required as a nominal value. The corresponding pulse-to-pause ratios of the PWM signals for the ignition agents Z1, Z2, Z3, or Z4, are 4/8, 5/8, 6/8, or 8/8.

FIG. 5 shows that this achieves an almost optimum energy distribution in relation to the minimum energies required.

When a squib melts in a trigger event, this can lead to short-time connections to ground so that—at least theoretically—an infinite short circuit current flows. This means that there is a danger that the autarchic capacitor C looses energy in an uncontrollable fashion. In order to avoid such a case, additional resistors are connected in series to the ignition agents Z1 to Z4 (compare FIG. 9, items R1 to R4). This increases the possible resistance values of ignition agents Z1 to Z4 from 1.6–6.6 ohms to 2.6–7.6 ohms for such drop resistors with a respective resistance value of 1 ohm. The total energy which is maximally required then increases to 0.73 Ws.

The bar chart diagram according to FIG. 6 shows a corresponding energy distribution, where respective resistance values of 1.6 ohms are assumed for ignition agents Z7 to Z4, and where the autarchic capacitor C features a capacity value of 4,700 μF (charge voltage 23 V). The pulse-to-pause ratios of the corresponding PWM signals correspond to the values 4/8, 5/8, 6/8, and 8/8. Here, the maximum current reaches a value of 8.85 A for 2.6 Ω. Even in this embodiment, it becomes clear that the energy distribution from capacitor C to the four ignition agents Z7 to Z4 is almost optimal; this means that very little energy is actually wasted.

Figure 8:
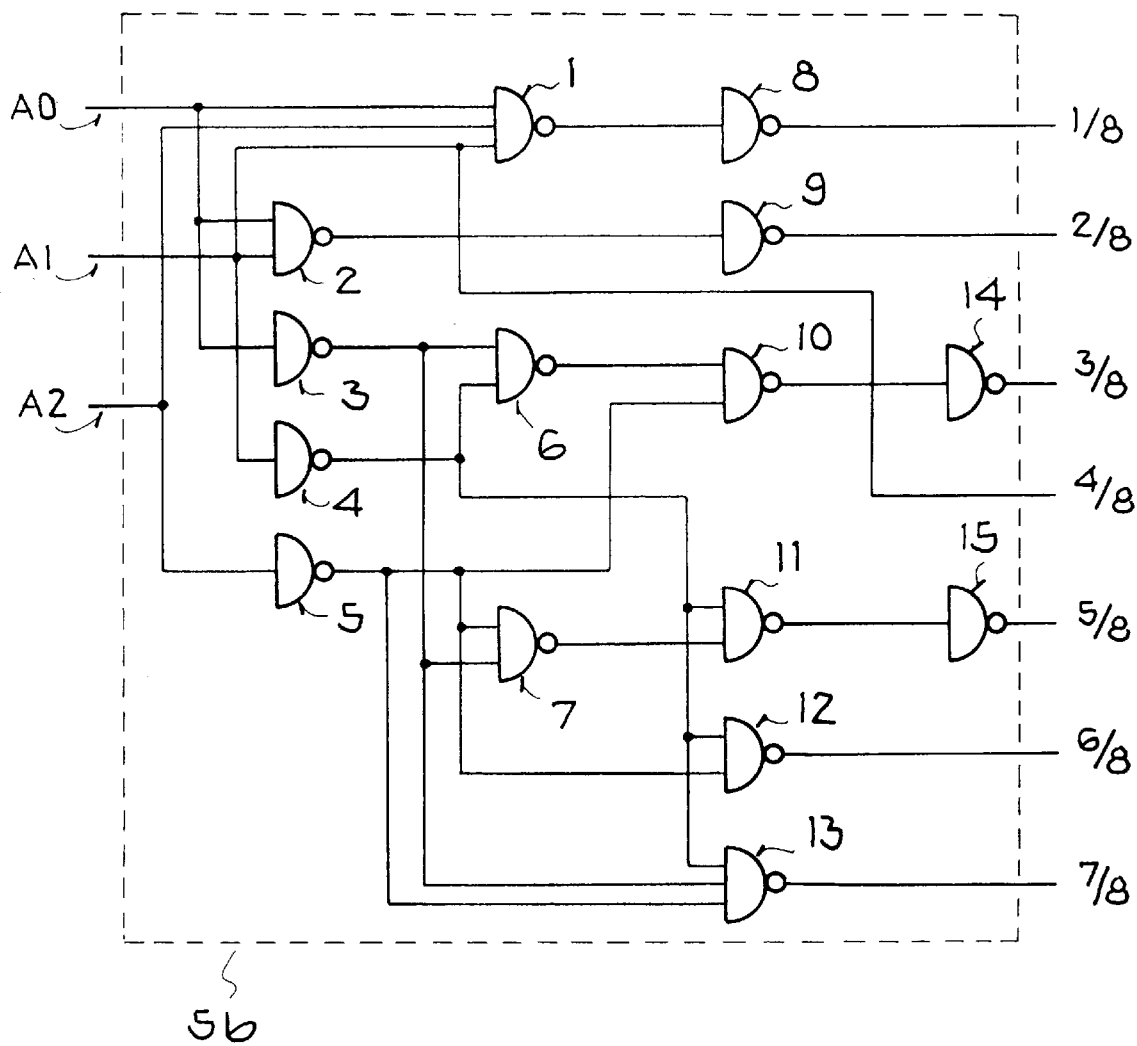
FIG. 8 is a circuit layout for an encoding component to generate different PWM signals from the clock signals A0, A1, and A2 generated by means of the circuit layout according to FIG. 8.

The circuit layouts according to FIG. 7 and FIG. 8 show how PWM signals with a 1/8 division can be generated. According to FIG. 7 such a layout comprises a clock pulse generator 4a for generating a clock pulse signal c/k (compare to FIG. 7a) which is fed into a 3 bit counter 5a. At outputs A0, A1, and A2 of this counter 5a, clock pulse signals that have been divided down (as shown in the FIGS. 7b, 7c, and 7d) are available. These clock pulse signals are fed to an encoding component 5b which generates therefrom the PWM signals complete with the corresponding pulse-to-pause ratios. A detailed circuit diagram of such an encoding component 5b is shown in FIG. 8 which has been configured completely from NAND gates. It generates all pulse-to-pause ratios of a PWM signal that can be represented by means of 3 bits.

In detail, this encoding circuit 5b is configured as follows: The clock pulse signal A0 is fed to a NAND gate 1, a NAND gate 2, and a NAND gate 3. The second clock pulse signal A1 is applied to an input of NAND gate 1, of NAND gate 2, and to the input of a NAND gate 4, with this clock pulse simultaneously representing the PWM signal with a pulse-to-pause ratio of 4/8. Finally, the 3rd clock pulse signal A2 is also fed to NAND gate 1 and a NAND gate 5.

Moreover, the output of NAND gate 3 leads to a NAND gate 6, a NAND gate 7, and a NAND gate 13. The output of NAND gate 4, however, is connected with an input of a NAND gate 6, a NAND gate 11, a NAND gate 12, and the NAND gate 13. The output of NAND gate 5 is connected with the input of a NAND gate 10, as well as with an input of NAND gate 7, with an input of NAND gate 12, and with an input of NAND gate 13.

The output of NAND gate 1 leads to a NAND gate 8; the output of NAND gate 2 leads to a NAND gate 9, and the output of NAND gate 6 leads to an input of NAND gate 10, and the output of NAND gate 7 leads to an input of NAND gate 11.

At the output of NAND gate 8 or NAND gate 9, a PWM signal is applied—with a pulse-to-pause ratio of 1/8 or 2/8. The output of NAND gate 10 is connected to a NAND gate 14 at which a PWM signal with a pulse-to-pause ratio of 3/8 is generated. A PWM signal with a pulse-to-pause ratio of 5/8 is generated by a NAND gate 15 postconnected to the NAND gate 11. NAND gate 12 supplies a PWM signal complete with 6/8 division, and finally, NAND gate 13 supplies a PWM signal with a pulse-to-pause ratio of 7/8.

Figure 9:
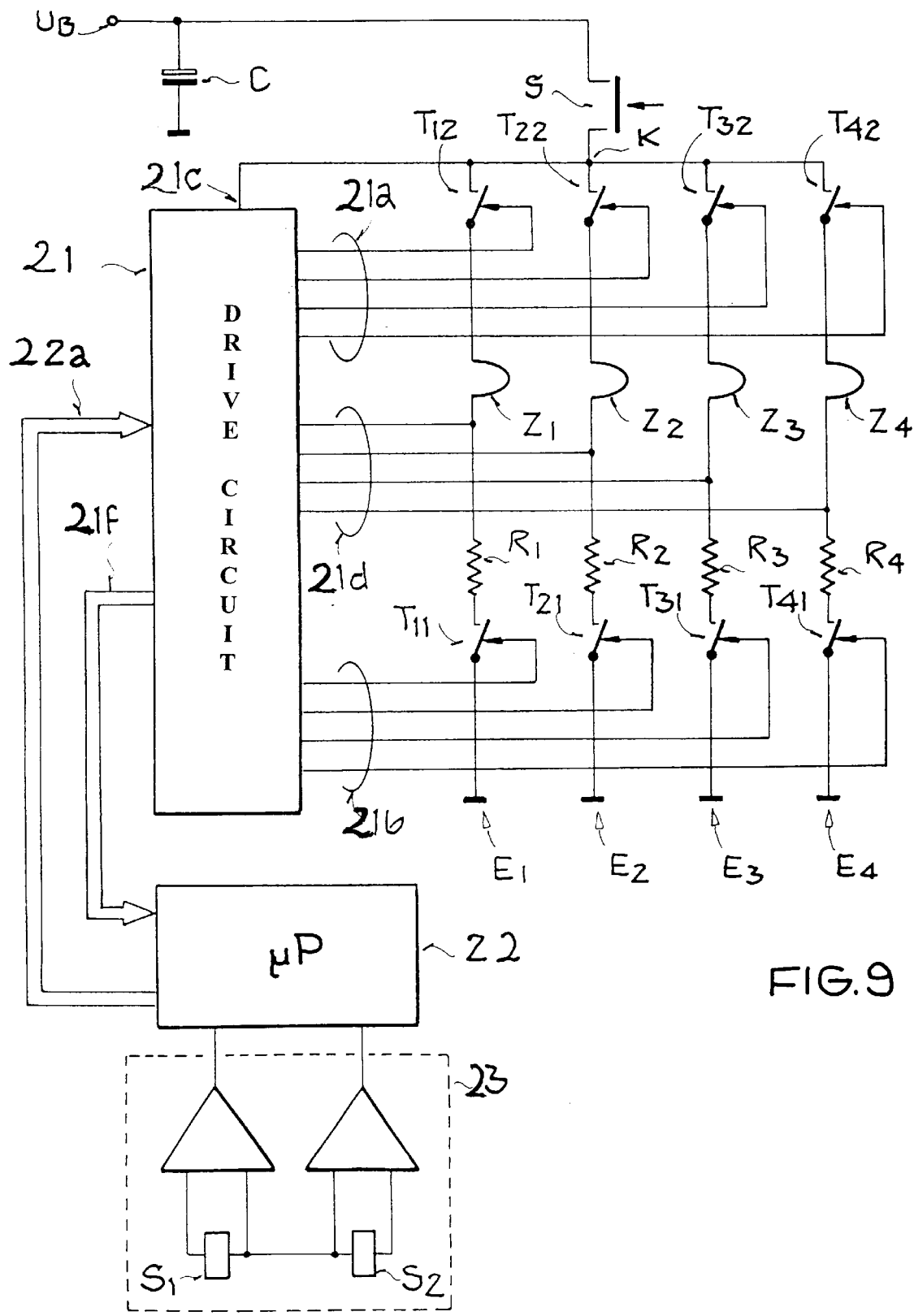
FIG. 9 is a detailed circuit diagram for implementing the process according to the invention.

In FIG. 9, a detailed circuit diagram complete with four ignition power amplifier stages E1, E2, E3, and E4 all connected in parallel is shown as a trigger circuit which is controlled by means of a drive circuit 21 and control unit 22 designed as a microprocessor.

Each ignition power amplifier stage $E_i$ (i=1–4) is configured from a series connection of an ignition agent $Z_i$ (i=1–4) as a squib for an airbag or a belt tensioner, a resistor $R_i$ (i=1–4), as well as a high side power amplifier transistor $T_{i2}$ (i=1–4) and a low side power amplifier transistor $T_{i1}$ (i=1–4). This parallel connection comprising 4 power amplifier stages E1 to E4 is arranged in series with safety switch S which in its turn is connected to an autarchic capacitor C or an operating voltage $U_B$.

Each one of the high side power amplifier transistors T12, T22, T32, and T42, respectively, will be driven from control circuit 21, using a respective control line 21a. In corresponding fashion, the same applies to the low side power amplifier transistors T11 to T41, respectively provided with a respective control line 21b.

In order to determine the resistance values of the squibs Z1–Z4, on the one hand these squibs Z1 to Z4 are respectively connected via a respective line 21d with control circuit 21, and on the other hand node K of the parallel circuit is connected to a line 21c. The resistors R1 to R4 located in the power amplifier stages are used to limit a short-circuit current that may possibly occur for a short time interval on ignition of the individual squibs Z1 to Z4—as detailed above in connection with the description provided for FIG. 6. The voltage drops across squibs Z1 to Z4, determined by means of control circuit 21, will be fed via a line 21f to microprocessor 22 for determining the corresponding resistance values. It is again microprocessor 22 which will determine from these respective resistance values the PWM signals with their associated respective pulse-to-pause ratios. These PWM signals will be fed, via a line 22a, to control circuit 21 which in its turn—via control lines 21a and 21b—drives the respective power amplifier transistors T12 to T42 or T11 to T41. For detecting the acceleration values acting on a motor vehicle, a sensor unit 23B complete with acceleration sensors S1 and S2 is provided whose sensor signals are fed to microprocessor 22 for evaluation. If microprocessor 22, based on the acceleration values detected, identifies a crash event hazardous to the vehicle occupants, a trigger signal is sent via line 22a to control circuit 21 such that squibs Z1 to Z4 will be activated via control lines 21a and 21b.

Respectively, the embodiments presented above for describing the process according to the invention only show 4 power amplifier stages connected in parallel that are driven by means of a PWM signal based on 3 bits. However, the process according to the invention is not limited to the parallel connection of 4 power amplifier stages but can be applied to a lower number of power amplifier stages connected in parallel or even a higher number of power amplifier stages connected in parallel, provided the autarchic capacitor C is appropriately dimensioned; it is even possible to change the 3 bit basis for the PWM signal.

What is claimed is:

1. A method for triggering a passive occupant protection system for motor vehicles of the type including a plurality of electric ignition agents for respective safety devices protecting a person in the vehicle in the event of a hazardous impact, and a trigger circuit which provides each of the electric ignition agents with ignition energy via a respective trigger current which, in the event of a functional failure occurring in the on-board electric system of the motor vehicle, is generated as the discharge current of an autarchic capacitor; said method comprising the steps of: measuring the resistance value of each ignition agent whilst the motor vehicle is in operation, in order to define therefrom the ignition energy required for the ignition of the respective ignition agent; in the event of a functional failure of the on-board electric system, simultaneously applying the discharge current of the autarchic capacitor in parallel to each of the electric ignition agents while pulse-width modulating the respective trigger current for each ignition agent such that the defined ignition energy required for the respective ignition agent is preset by the respective pulse-to-pause ratio of the respective trigger current based on the respective measured resistance.

2. A circuit triggering a passive occupant protection system for motor vehicles including: a plurality of electric ignition agents for respective safety devices protecting a person in the vehicle in the event of a hazardous impact: at least one respective controllable switch connected in series with each said ignition agents and a trigger circuit for simultaneously providing each of the electric ignition agents with ignition energy via a respective trigger current which, in the event of a functional failure occurring in the on-board electric system of the motor vehicle, is generated by the discharge current of an autarchic capacitor, said trigger circuit including a control circuit for driving each of the controllable switches with a pulse-width modulated signal to provide a respective pulse-width modulated trigger current for each ignition agent which corresponds to the respective ignition energy required for the respective ignition agent and whose pulse-to-pause ratio is preset and is based on a measured resistance of the respective ignition agent.

3. A circuit according to claim 2 wherein: said control circuit further includes: means for applying a measurement current to each ignition agent, which measurement current does not trigger an ignition of the respective ignition agent, to determine the associated voltage drop across the respective ignition agent; and a control unit for detecting the resistance of the respective ignition agent from the associated voltage drop across the respective ignition agents.

* * * * *